Nov. 11, 1924.
G. R. FOWLER
1,515,570
FRUIT BASKET COVER AND HOLDER
Filed Jan. 22, 1924    2 Sheets-Sheet 1
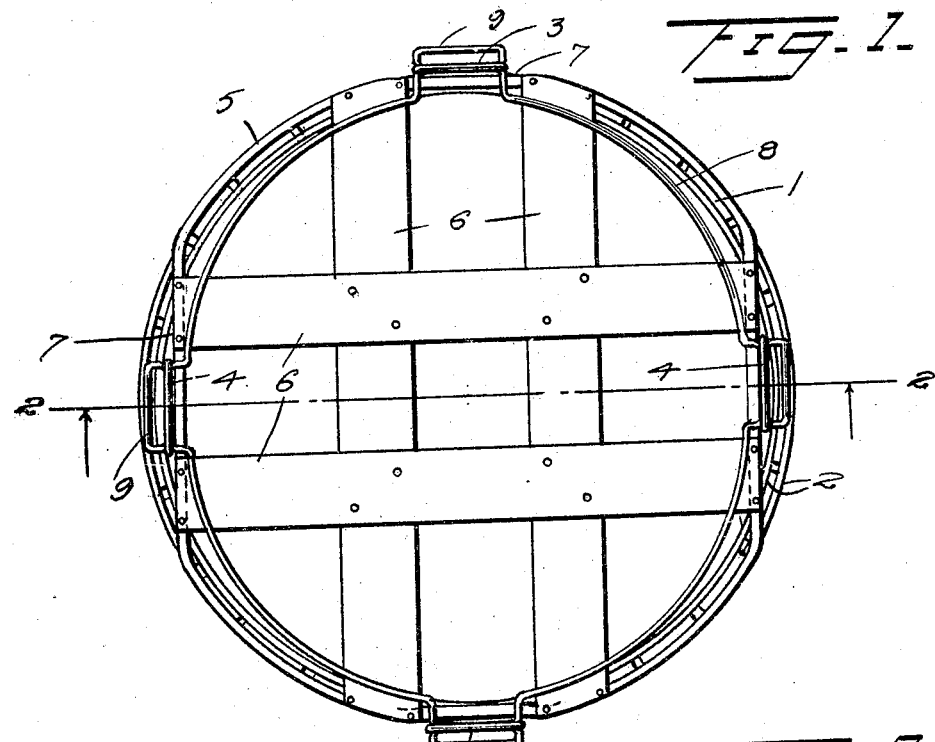
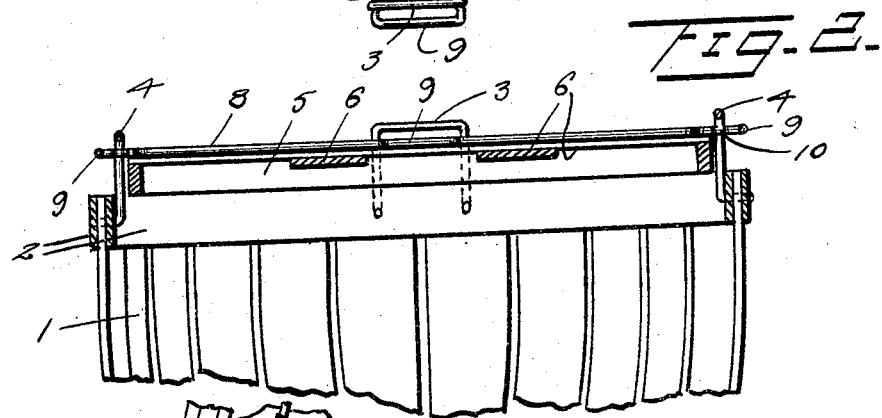
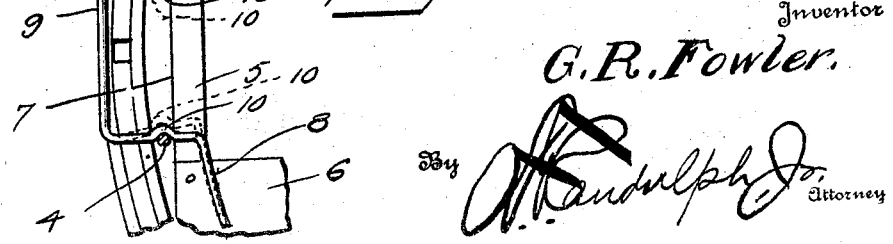
Inventor
G. R. Fowler.

Nov. 11, 1924.  
G. R. FOWLER  
FRUIT BASKET COVER AND HOLDER  
Filed Jan. 22, 1924        2 Sheets-Sheet 2
1,515,570
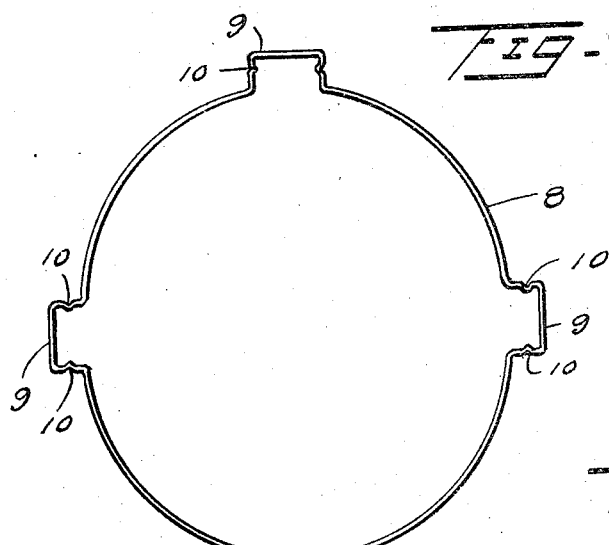
Fig. 4.
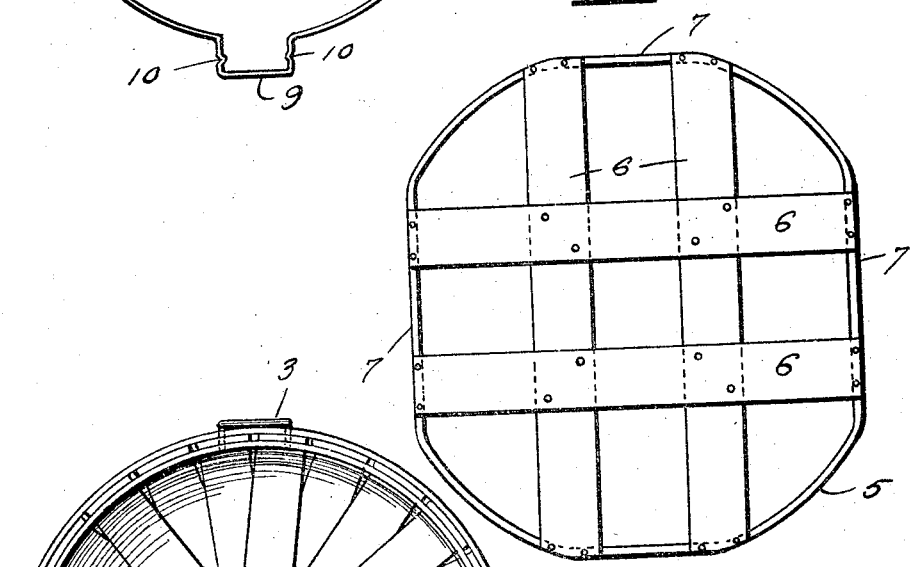
Fig. 5.
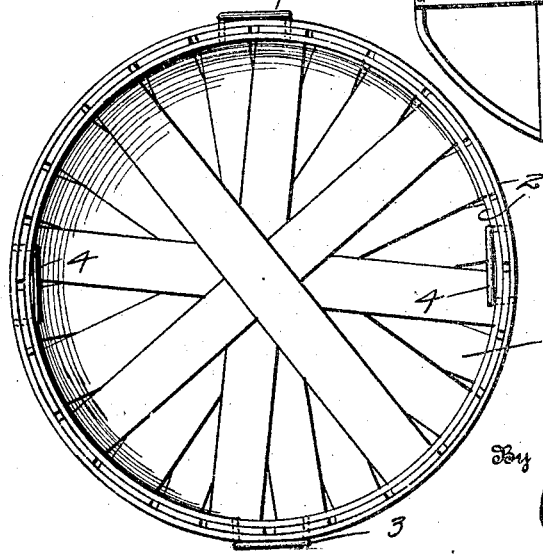
Fig. 6.
Inventor  
G. R. Fowler.
By  
Attorney Patented Nov. 11, 1924.

1,515,570

UNITED STATES PATENT OFFICE.

GEORGE R. FOWLER, OF MARLBORO, NEW YORK.

FRUIT-BASKET COVER AND HOLDER.

Application filed January 22, 1924. Serial No. 687,813.

*To all whom it may concern:*

Be it known that I, GEORGE R. FOWLER, a citizen of the United States, residing at Marlboro, in the county of Ulster and State of New York, have invented certain new and useful Improvements in Fruit-Basket Covers and Holders; and I do hereby declare the following to be a full, clear, and exact description of the invention, such as will enable others skilled in the art to which it appertains to make and use the same.

The invention has relation to splint baskets generally used for marketing fruit and vegetables, and has for its object to provide a cover for the basket and holding means for the cover to retain the same in place and yet admit of the cover being removed when required and replaced and made secure without destroying either the cover or holder, or necessitating the use of tools when removing or replacing said cover and securing the same.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view showing the application of the invention,

Figure 2 is a sectional view on the line 2—2 of Figure 1,

Figure 3 is an enlarged detail view, the full lines showing the loop of the retainer in locking engagement with a handle of the basket, and the dotted lines showing the loop contracted to permit of its engagement with or disengagement from the basket handle, Figure 4 is a plan view of the cover holder or retainer, Figure 5 is a plan view of the cover, and Figure 6 a detail view of the basket.

Corresponding and like parts are referred to in the following description and designated in the several views of the drawings by like reference characters.

The numeral 1 designates a split basket such as generally provided for receiving fruit, vegetables and other commodity for the market, the body of the basket consisting of splints and the upper edge reinforced by inner and outer hoops 2. In accordance with the invention, the basket 1 is provided with four handles, two of the handles 3 being oppositely disposed and located exterior to the hoops 2, and the other two handles 4 being located upon the inner side of the hoops 2 and at a right angle to the line of the handles 3. The handles 3 and 4 are of usual formation consisting of wire bent into U-form and secured to the hoops 2 in any preferred way.

The cover comprises hoop 5 and crossing strips 6, the latter being connected at the point of crossing and made fast at their ends to the hoop 5. The sides of the cover are flattened as indicated at 7, the flattened portions corresponding in position with the handles 3 and 4 so as to come opposite the same when the cover is placed in position upon the basket, the edge portions of the cover intermediate the flattened sides 7 engaging and resting upon the top edge of the basket intermediate adjacent handles. The flattened sides 7 provide clearance for the handles, thereby admitting of the cover being easily placed in position or removed from the basket.

The holder or retainer for securing the cover to the basket is formed of wire of suitable gage and consists of a link 8 provided at regular intervals with outwardly disposed loops 9 which correspond in position with the handles 3 and 4 so as to engage the same. The side elements of the loops 9 have inwardly disposed crimps 10 which provide notches to receive the side elements of the handles after the loops 9 have been passed therethrough. The formation of the retainer of wire and the loops 9 consisting of outwardly bent portions thereof result in the formation of a retainer which may be readily sprung into position to secure the cover and readily removed when access to the basket is required. The loops 9 are thrust through the handles 3 and 4 and when placing the loops in position or removing them from the handles, the side elements of the loops are depressed to admit of the loops clearing the handles, as indicated by the dotted lines in Figure 3, and when the loops are in engagement with the handles, the crimps 10 receive the side elements of the handles thereby positively engaging the same and preventing casual disengagement of the retainer. The disposition of the handles and the positive interlocking of the retainer therewith results in bracing and strengthening the basket, whereby the same is enabled to withstand rough usage.

What is claimed is:

1. A basket provided with a handle, a cover for the basket, and a retainer consisting of a ring of wire and for securing the cover, said retainer including a loop adapted to engage the handle and secure the cover.

2. A basket provided with a handle, a cover for the basket, and a retainer for securing the cover, said retainer including a loop adapted to engage the handle and secure the cover, said loop having opposite portions notched to positively engage side elements of the handle.

3. A basket provided with a handle, a cover for the basket, and a retainer for securing the cover, said retainer including a loop adapted to engage the handle and secure the cover, said loop adapted to pass through the handle and having side portions inwardly crimped and adapted to be pressed together to clear the handle when placing the retainer in position or removing it from the handle, said crimp receiving opposite portions of the handle to make positive engagement therewith.

4. A basket having its top reinforced by means of a hoop, and handles applied to the inner and outer sides of the hoop, a cover for the basket having portions opposite the handles clearing the same, and a retainer for the cover consisting of a ring having outwardly disposed loops adapted to engage the handles of the basket.

5. A basket provided with handles, a cover for the basket and a retainer for the cover, said retainer consisting of a ring of wire having outwardly disposed loops adapted to pass through the handles of the basket and each of said loops having side elements inwardly crimped to make positive engagement with the handles of the basket.

6. A basket provided with four handles set quartering, two of the handles being disposed upon the inner side of the basket and two upon the outer side thereof, a cover for the basket having side portions flattened to clear the handles, and a retainer for the cover consisting of a wire ring having outwardly disposed loops to pass through the handles of the basket and having side portions inwardly crimped to positively engage the handles and secure the retainer when in position.

In testimony whereof I affix my signature.

GEORGE R. FOWLER.